UNITED STATES PATENT OFFICE.

JOHN D. WILLIAMS, OF ALLEGHENY CITY, PENNSYLVANIA.

IMPROVEMENT IN THE MANUFACTURE OF IRON.

Specification forming part of Letters Patent No. 49,331, dated August 8, 1865; antedated July 9, 1865; Reissue No. 2,073, dated September 19, 1865.

*To all whom it may concern:*

Be it known that I, JOHN D. WILLIAMS, of the city and county of Allegheny, in the State of Pennsylvania, have invented a new and useful Improvement in the Manufacture of Iron; and I do hereby declare that the following is a full, clear and exact description thereof.

The nature of my invention consists in the use of sulphuric acid, water, salt, lime, potash, sulphate of copper, protoxide of lead, biborate of soda, nitrate of potassa, and manganese, said ingredients being prepared and mixed with melted iron during the puddling or boiling process, in the manner, hereinafter described, for the purpose of purifying, toughening, strengthening, and imparting different degrees of hardness to iron.

To enable others skilled in the art of puddling or boiling iron to use my invention, I will proceed to describe the manner of preparing the ingredients used and the mode of using them.

For the purpose of making a hard, tough, and strong iron, to each charge of pig-iron, which consists, as a general thing, of about four hundred and eighty pounds, I take about one pound of sulphuric acid, one quart of water, one pound of lime, two pounds of salt, one-fourth pound of biborate of soda, (borax,) and one-fourth pound of nitrate of potassa, (saltpeter.) I dilute the sulphuric acid with the water, slake the lime, and pulverize the biborate of soda and the nitrate of potassa. I then add to these pulverized ingredients the salt and slaked lime, and mix them well together, and dissolve the whole in the acid dilution, and then divide it into three or four parts. This forms my first preparation.

For making a tough and strong iron of medium hardness, to each "charge" of pig-iron of about four hundred and eighty pounds I take about one-half pound of sulphuric acid, one quart of water, one pound of salt, one-half pound of lime, (slaked,) one pound of sulphate of copper, (blue vitriol,) one pound of protoxide of lead, (litharge,) one-half pound of nitrate of potassa, (saltpeter,) and one pound of manganese, (black oxide.) I dilute the sulphuric acid with the water, pulverize and mix the other ingredients well together and dissolve them in the diluted acid, and then divide the whole into three or four parts. This forms my second preparation.

For making a very soft, tough, and strong iron, to each charge of about four hundred and eighty pounds I take about one pound of protoxide of lead, (litharge,) one-half pound of sulphate of copper, (blue vitriol,) one-half pound of biborate of soda, (borax,) one-half pound of manganese, (black oxide,) one pound of potash, one pound of salt. I pulverize and mix these ingredients well together, and divide the whole into three or four parts, and use this preparation in the dry condition.

I wish it to be clearly understood that the quantity of each ingredient in the compounds herein described may be varied and a good result obtained. Therefore I do not confine myself to any precise quantity of any one ingredient in any one of the compounds described. I also wish it to be clearly understood that any known equivalent for any one of the ingredients mentioned may be used, when so desired, without changing the constitution and nature of the compounds or their effect on the iron in the puddling or boiling process, provided the compounds are used and manipulated with the iron and furnace, substantially as hereinafter described. Therefore I claim the use of the ingredients herein named and their equivalents when used for forming the compounds described, for the law of substitution in chemical compounds is "that one or more atoms of an element in a compound may be replaced by any other element or group of elements which are equivalent in their chemical relations, and the chemical constitution of the compound remains unchanged," and I desire it to be clearly understood that any known combination of pig-iron can and may be used in my process when desired; but the various combinations now known and used are not important to the success of my process or operation.

I use the ordinary puddling or boiling furnace, with all its appendages and appliances, taking care, however, to have the depth of the furnace from the "fore plate" to the "bottom plate" about ten inches. I prepare the furnace with "fix," (black ore,) and charge it with about four hundred and eighty pounds of pig-iron and about double the quantity of cinder usually used in working off a charge. I melt the iron in the ordinary manner, and when the iron is melted down I lower the damper, so as to close the furnace-stack. I then take one part of the compound I propose to use, which must be in accordance with the kind of iron desired—that is to say, when I desire to make a tough, strong, and hard iron, I take one part of the first preparation herein mentioned and throw it in on the melted iron and mix and manipulate it with the iron for about five minutes. I then take the second, third, and fourth parts of said preparation and mix and manipulate in the same manner as the first part, taking about five minutes to each part. In other words, I so divide each preparation herein set forth that it will require about twenty minutes to mix and stir it well with the melted iron. I then raise the damper of the stack and puddle or boil in the usual manner, taking care, however, to puddle or boil hot until the iron commences to "sink." I then lower the damper as low as the condition of the iron and furnace will admit, taking care to work and manipulate the iron with as low a degree of heat as possible until the iron is "ready." I then draw it off in the usual manner and work it in "squeezers," "rolls," &c., in the ordinary way. I then charge up the furnace again and proceed in the manner as described.

Having thus described the nature and operation of my improvement, what I claim as of my invention is—

The use of the ingredients herein named and their equivalents and the mode of using them, and the manner of operating the furnace, substantially as described, and for the purpose set forth.

JOHN D. WILLIAMS.

Witnesses:

JAMES J. JOHNSTON,
ALEXANDER HAYS.